(12) United States Patent
Kasai et al.

(10) Patent No.: US 7,449,814 B2
(45) Date of Patent: Nov. 11, 2008

(54) DRIVING METHOD FOR ULTRASONIC MOTOR AND APPARATUS USING THE SAME

(75) Inventors: Yasuaki Kasai, Saitama (JP); Makoto Harada, Tokyo (JP)

(73) Assignee: Olympus Corporation, Tokyo (JP)

( * ) Notice: Subject to any disclaimer, the term of this patent is extended or adjusted under 35 U.S.C. 154(b) by 223 days.

(21) Appl. No.: 11/452,814

(22) Filed: Jun. 14, 2006

(65) Prior Publication Data

US 2006/0290234 A1      Dec. 28, 2006

(30) Foreign Application Priority Data

Jun. 23, 2005    (JP)    ............... 2005-182991

(51) Int. Cl.
 *H01L 41/08*   (2006.01)
(52) U.S. Cl. ................................. 310/323.02
(58) Field of Classification Search ............ 310/316.01, 310/316.02, 323.12, 323.16
See application file for complete search history.

(56) References Cited

U.S. PATENT DOCUMENTS

| | | | |
|---|---|---|---|
| 4,513,219 A * | 4/1985 | Katsuma et al. ............. | 310/328 |
| 4,560,263 A * | 12/1985 | Katsuma et al. ............. | 396/133 |
| 6,084,335 A * | 7/2000 | Tamai ................... | 310/316.02 |
| 6,717,329 B2 * | 4/2004 | Yoshida et al. ......... | 310/316.02 |
| 6,727,635 B2 * | 4/2004 | Okamoto et al. ....... | 310/316.01 |

FOREIGN PATENT DOCUMENTS

JP      07-131986      5/1995

\* cited by examiner

*Primary Examiner*—Mark Budd
(74) *Attorney, Agent, or Firm*—Scully, Scott, Murphy & Presser, P.C.

(57) ABSTRACT

A method for driving an ultrasonic motor includes the step of applying a driving alternating signal to an ultrasonic vibrator to simultaneously generate two different vibration modes in the ultrasonic vibrator to cause a substantially elliptical vibration at friction-contact members of the ultrasonic vibrator, thus relatively moving the ultrasonic vibrator and a driven body in contact with the ultrasonic vibrator. A preliminary vibration domain in which a preliminary vibration smaller than the substantially elliptical vibration is generated at the friction-contact members is provided prior to a main vibration domain in which the driving alternating signal is applied.

6 Claims, 7 Drawing Sheets

DRIVING METHOD FOR ULTRASONIC MOTOR AND APPARATUS USING THE SAME

BACKGROUND OF THE INVENTION

1. Field of the Invention

The present invention relates to a driving method for an ultrasonic motor and an apparatus using the same.

This application is based on Japanese Patent Application No. 2005-182991, the content of which is incorporated herein by reference.

2. Description of Related Art

Recently, ultrasonic motors have been drawing attention as a new type of motor replacing electromagnetic motors. Ultrasonic motors have the following advantages over known electromagnetic motors:

1) Ultrasonic motors are capable of high torque without using gears;
2) Ultrasonic motors have holding force when powered off;
3) Ultrasonic motors have high resolution; and
4) Ultrasonic motors are quiet.

A known method of driving such ultrasonic motors is disclosed, for example, in Japanese Unexamined Patent Application Publication No. 07-131986. More specifically, in the technique disclosed in Japanese Unexamined Patent Application Publication No. 07-131986, when an ultrasonic motor is to be rotationally driven, two-phase alternating signals are applied to excite traveling elastic waves so that the ultrasonic motor is driven stably and efficiently without causing abnormal noise or vibration during the startup operation of the ultrasonic motor.

Unfortunately, the above-described known technique is problematic in that when alternating signals are applied, traveling elastic waves are abruptly excited, which causes sticking and slipping and leads to unstable driving of the ultrasonic motor at the initial driving time. The known technique has another disadvantage in that large drive noise is generated during the initial driving time of the ultrasonic motor.

BRIEF SUMMARY OF THE INVENTION

The present invention has been conceived in light of the above-described circumstances, and an object thereof is to provide a driving method for an ultrasonic motor, as well as an apparatus using the same, which can be stably driven with reduced drive noise.

In order to realize the object described above, the present invention provides the following solutions.

A method for driving an ultrasonic motor according to a first aspect of the present invention includes the step of applying a driving alternating signal to an ultrasonic vibrator to simultaneously generate two different vibration modes in the ultrasonic vibrator to cause a substantially elliptical vibration at an output terminal thereof, thus relatively moving the ultrasonic vibrator and a driven body in contact with the ultrasonic vibrator. In this method, a preliminary vibration domain in which a preliminary vibration smaller than the substantially elliptical vibration is generated at the output terminal is provided prior to a main vibration domain in which the driving alternating signal is applied.

When driving is initiated, the output terminal of the ultrasonic vibrator and the driven body are contacted together. The preliminary vibration generated at the output terminal of the ultrasonic vibrator in this state can break this contact. In other words, the frictional force at the contact portion can be reduced. Thereafter, in this state, the driving alternating signal is applied in the main vibration domain. In this manner, sticking and slipping is prevented from occurring, and therefore, the ultrasonic vibrator and the driven body are allowed to move smoothly relative to each other. As a result, stable driving can be initiated and drive noise can be reduced.

It is preferable that the preliminary vibration be generated at the output terminal in the preliminary vibration domain in such a manner that a force applied to the driven body from the output terminal does not exceed a static frictional force. More preferably, the preliminary vibration should be such that the dynamic frictional force occurring at the output terminal is as close to the static frictional force as possible.

By generating preliminary vibration as described above such that a force applied from the output terminal to the driven body does not exceed the static frictional force, the occurrence of sticking and slipping can be prevented reliably. In addition, by generating preliminary vibration such that the dynamic frictional force occurring at the output terminal is approximated to the static frictional force as far as possible, the condition in the preliminary vibration domain can be made to more closely approach the condition in the main vibration domain. As a result, in the main vibration domain, the ultrasonic vibrator and the driven body can be moved even more smoothly relative to each other.

Furthermore, it is preferable that an ending vibration domain in which an ending vibration smaller than the substantially elliptical vibration is generated at the output terminal be provided after the main vibration domain.

By generating an ending vibration that is smaller than the substantially elliptical vibration related to the main vibration domain after the main vibration domain, the vibration at the output terminal can be reduced more than if the ultrasonic motor were abruptly halted in the main vibration domain. In short, by doing so, driving of the ultrasonic motor can be ceased more smoothly.

For example, at least one of a preliminary alternating signal applied to the ultrasonic vibrator in the preliminary vibration domain and an ending alternating signal applied to the ultrasonic vibrator in the ending vibration domain is preferably a signal having an amplitude smaller than the amplitude of the driving alternating signal or a duty ratio smaller than the duty ratio of the driving alternating signal. The preliminary alternating signal in this case may be changed gradually so that, for example, the amplitude or the duty ratio thereof approaches the amplitude or the duty ratio of the driving alternating signal. On the other hand, the ending alternating signal in this case may be gradually changed to zero by gradually decreasing the amplitude or the duty ratio thereof from those of the driving alternating signal to zero.

An apparatus for driving an ultrasonic motor according to a second aspect of the present invention includes a unit configured to apply a driving alternating signal to an ultrasonic vibrator to simultaneously generate two different vibration modes in the ultrasonic vibrator to cause a substantially elliptical vibration at an output terminal thereof, thus relatively moving the ultrasonic vibrator and a driven body in contact with the ultrasonic vibrator. In this apparatus, a preliminary vibration domain in which a preliminary vibration smaller than the substantially elliptical vibration is generated at the output terminal is provided prior to a main vibration domain in which the driving alternating signal is applied.

According to the present invention, stable driving can be achieved and drive noise can be reduced.

DETAILED DESCRIPTION OF THE INVENTION

A driving method for an ultrasonic motor and an apparatus using the same according to an embodiment of the present invention will now be described with reference to the drawings.

Figure 1:
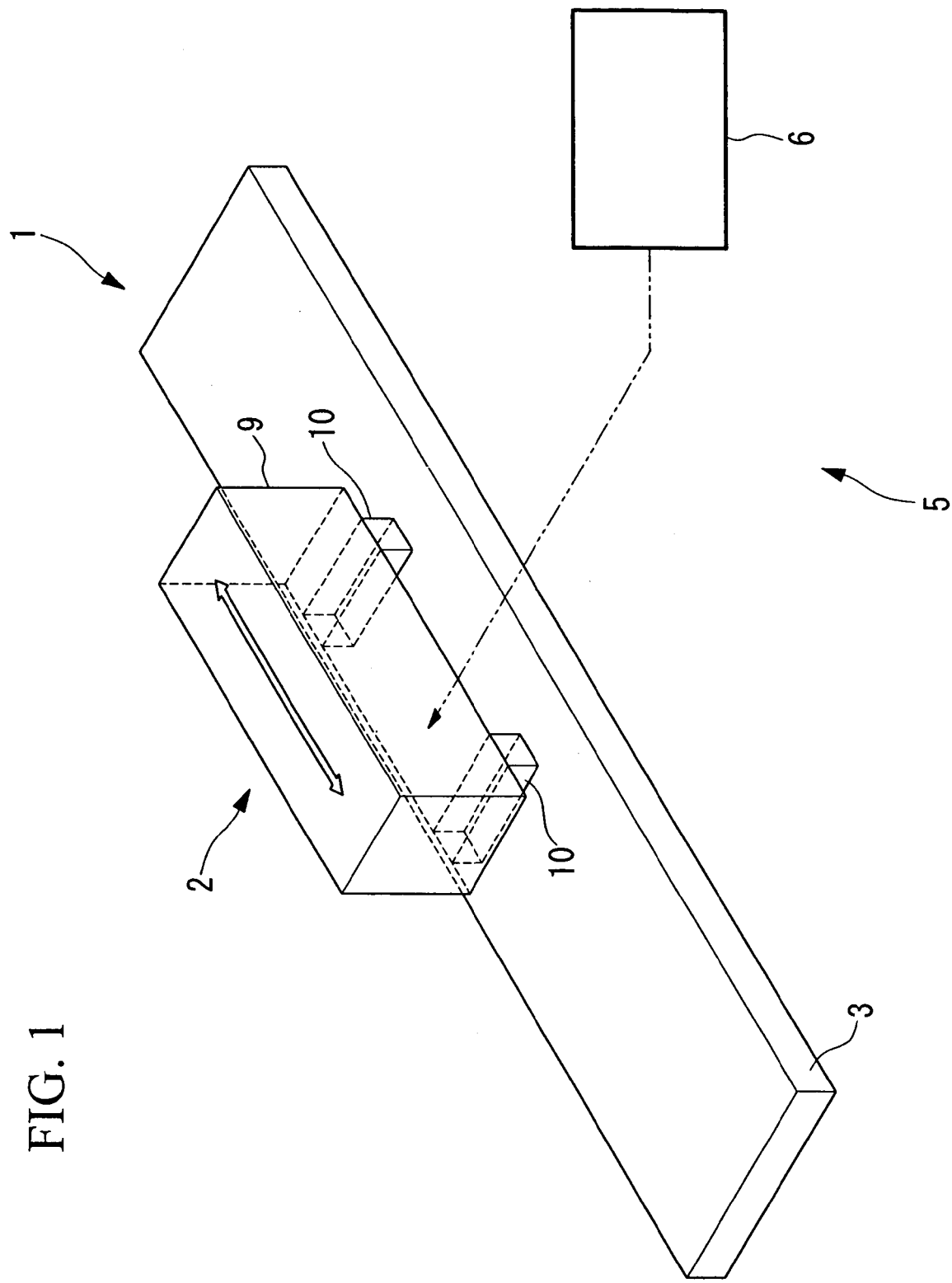
FIG. 1 is a diagram depicting the overall structure of an ultrasonic motor according to one embodiment of the present invention.

Referring to FIG. 1, an ultrasonic motor 1 according to this embodiment includes an ultrasonic vibrator 2 and a driven body 3 that is driven by the ultrasonic vibrator 2. An ultrasonic motor system 5 according to this embodiment includes the above-described ultrasonic motor 1 and a driving apparatus 6 that drives the ultrasonic motor 1.

Figure 2:
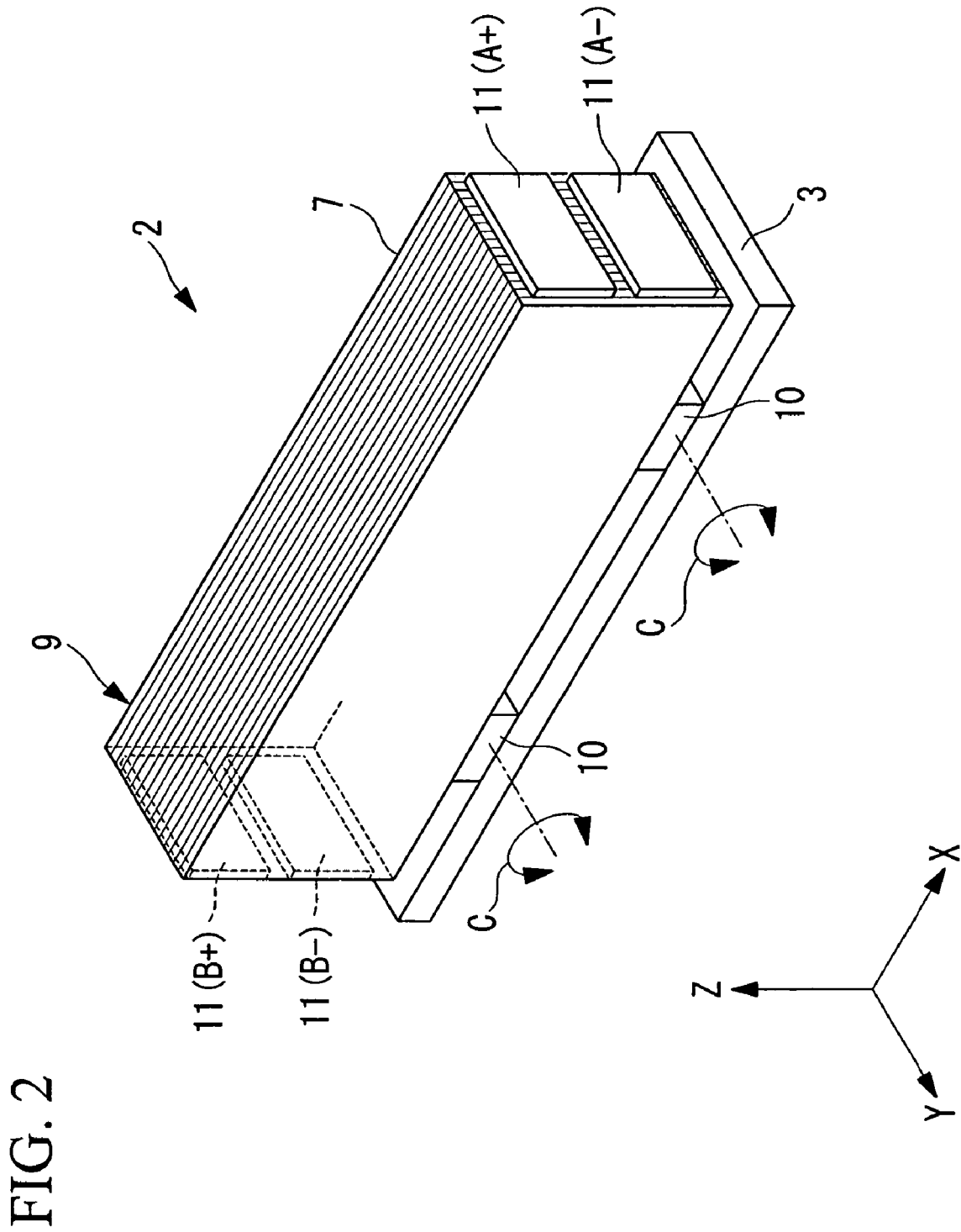
FIG. 2 is a perspective view of an ultrasonic vibrator in the ultrasonic motor shown in FIG. 1.
Figure 3:
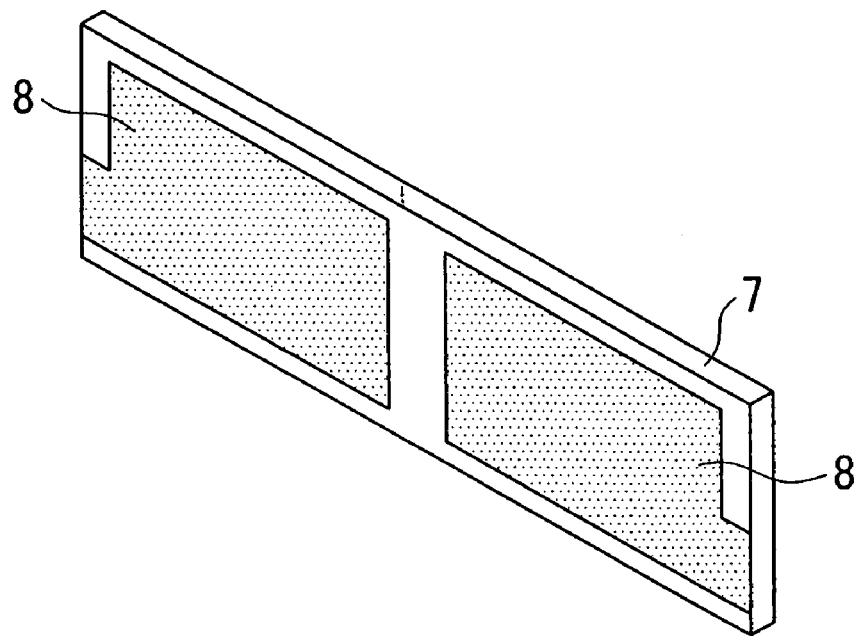
FIG. 3 is a perspective view of a piezoelectric ceramic sheet constituting a piezoelectric layered member shown in FIG. 2.
Figure 4:
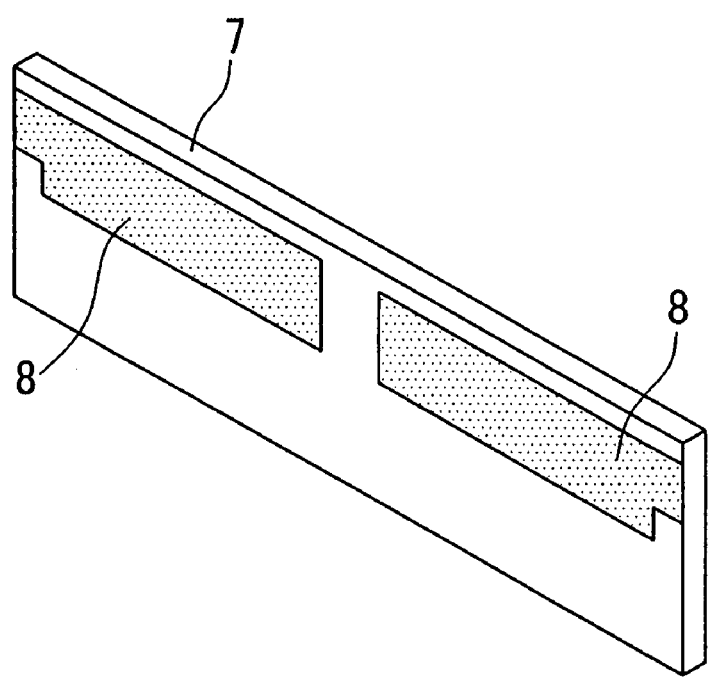
FIG. 4 is a perspective view of another piezoelectric ceramic sheet constituting the piezoelectric layered member shown in FIG. 2.

Referring to FIGS. 2 to 4, the above-described ultrasonic vibrator 2 includes a rectangular-block-shaped piezoelectric layered member 9 and two friction-contact members 10. The piezoelectric layered member 9 is made up of a stack of rectangular piezoelectric ceramic sheets 7 each having thin inner electrodes 8 (refer to FIGS. 3 and 4) on one side thereof. The two friction-contact members 10 are in close contact with two output terminals, respectively, formed on one side in the width direction of the piezoelectric layered member 9.

The piezoelectric ceramic sheet 7 illustrated in FIG. 3 has two inner electrodes 8 on one surface thereof such that the inner electrodes 8 occupy most of the surface area. The two inner electrodes 8 are disposed with a predetermined insulating distance therebetween in the longitudinal direction of the piezoelectric ceramic sheet 7. Each of the two inner electrodes 8 is disposed with a predetermined gap from the edge of the piezoelectric ceramic sheet 7, except for one part that extends to the edge of the piezoelectric ceramic sheet 7.

The piezoelectric ceramic sheet 7 illustrated in FIG. 4 has two inner electrodes 8 disposed in an area corresponding to substantially half of the width of the piezoelectric ceramic sheet 7. The two inner electrodes 8 are disposed with a predetermined insulating distance therebetween in the longitudinal direction of the piezoelectric ceramic sheet 7. Each of the two inner electrodes 8 is disposed with a predetermined gap from the edge of the piezoelectric ceramic sheet 7, except for one part that extends to the edge of the piezoelectric ceramic sheet 7.

The two different types of piezoelectric ceramic sheets 7 provided with the different-shaped inner electrodes 8 (i.e., the piezoelectric ceramic sheet 7 illustrated in FIG. 3 provided with large inner electrodes 8 and the piezoelectric ceramic sheet 7 illustrated in FIG. 4 provided with small inner electrodes 8) are alternately stacked to form the rectangular piezoelectric layered member 9.

A total of four external electrodes 11 are provided on the piezoelectric layered member 9, two on each end face in the longitudinal direction of the piezoelectric layered member 9. The external electrodes 11 are each connected to all of the inner electrodes 8 provided at the same position on the same type of piezoelectric ceramic sheets 7. Accordingly, the inner electrodes 8 that are disposed at the same position on the same type of piezoelectric ceramic sheets 7 have the same potential. The external electrodes 11 have electrical connections that are not shown in the drawings. The electrical connections may be established by any type of flexible wiring material, such as lead wires or flexible substrates.

The operation of the piezoelectric layered member 9 will now be described.

Figure 5:
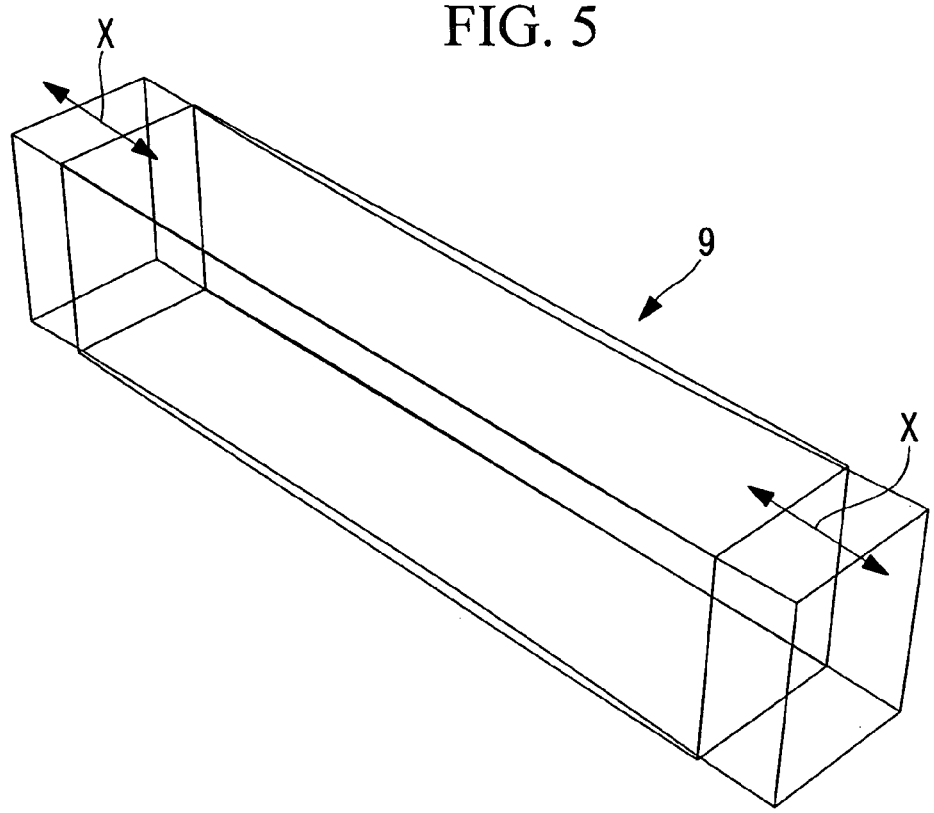
FIG. 5 is a diagram illustrating a computer analysis of the vibration of the piezoelectric layered member in FIG. 2 in a first-order longitudinal vibration mode.
Figure 6:
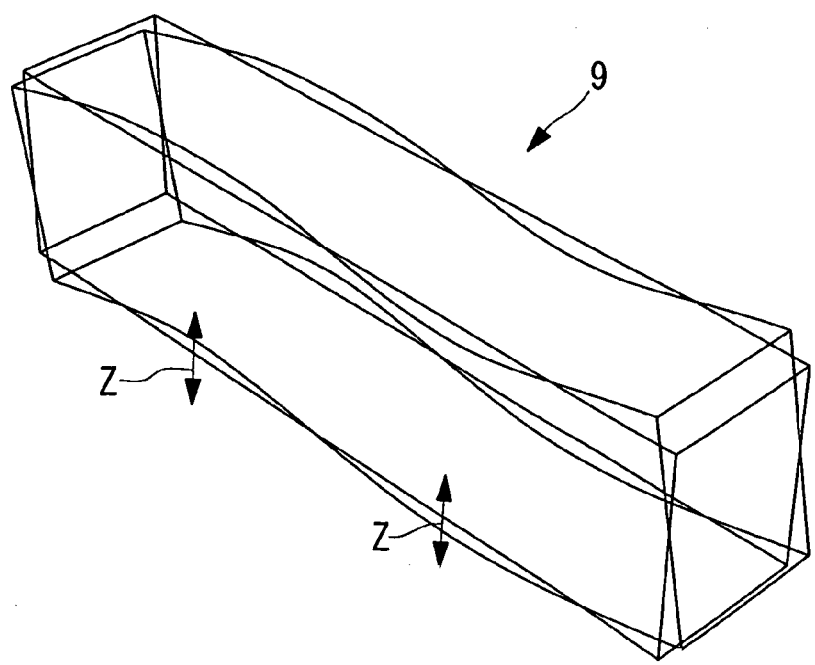
FIG. 6 is a diagram illustrating a computer analysis of the vibration of the piezoelectric layered member in FIG. 2 in a second-order flexural vibration mode.

The two external electrodes 11 that are provided on a first longitudinal end of the piezoelectric layered member 9 are defined as A-phase (A+ and A−) external electrodes 11, and the two external electrodes 11 that are provided on a second longitudinal end of the piezoelectric layered member 9 correspond to B-phase (B+ and B−) external electrodes 11. By applying alternating-current (AC) voltages corresponding to resonant frequencies and having synchronous phases to the A-phase and B-phase external electrodes 11, the piezoelectric layered member 9 is excited and a first-order longitudinal vibration is generated, as illustrated in FIG. 5. By applying AC voltages corresponding to resonant frequencies and having opposite phases to the A-phase and B-phase external electrodes 11, a second-order flexural vibration is excited, as illustrated in FIG. 6. FIGS. 5 and 6 illustrate the results of a computer analysis based on a finite element method.

The friction-contact members 10 are displaced in the longitudinal direction of the piezoelectric layered member 9 (that is, the X direction in FIG. 5) when a first-order longitudinal vibration is generated in the piezoelectric layered member 9. On the other hand, the friction-contact members 10 are displaced in the width direction of the piezoelectric layered member 9 (that is, the Z direction in FIG. 6) when a second-order flexural vibration is generated in the piezoelectric layered member 9.

Consequently, by applying 90° phase-shifted alternating-current voltages corresponding to the resonant frequencies to the A-phase and B-phase external electrodes 11 of the ultrasonic vibrator 2, the first-order longitudinal vibration and the second-order flexural vibration are generated simultaneously. As a result, a substantially elliptic vibration in a clockwise or counterclockwise direction is generated at the friction-contact members 10, as indicated by arrows C in FIG. 2.

Next, a method of driving the ultrasonic motor 1 according to this embodiment with the above-described structure will be described. First, when the ultrasonic motor 1 is to be driven, the friction-contact members 10 provided on the ultrasonic vibrator 2 are pressed onto the top surface of the driven body 3 by a pressing mechanism (not shown in the drawings). In other words, the friction-contact members 10 and the top surface of the driven body 3 are contacted together.

Figure 7:
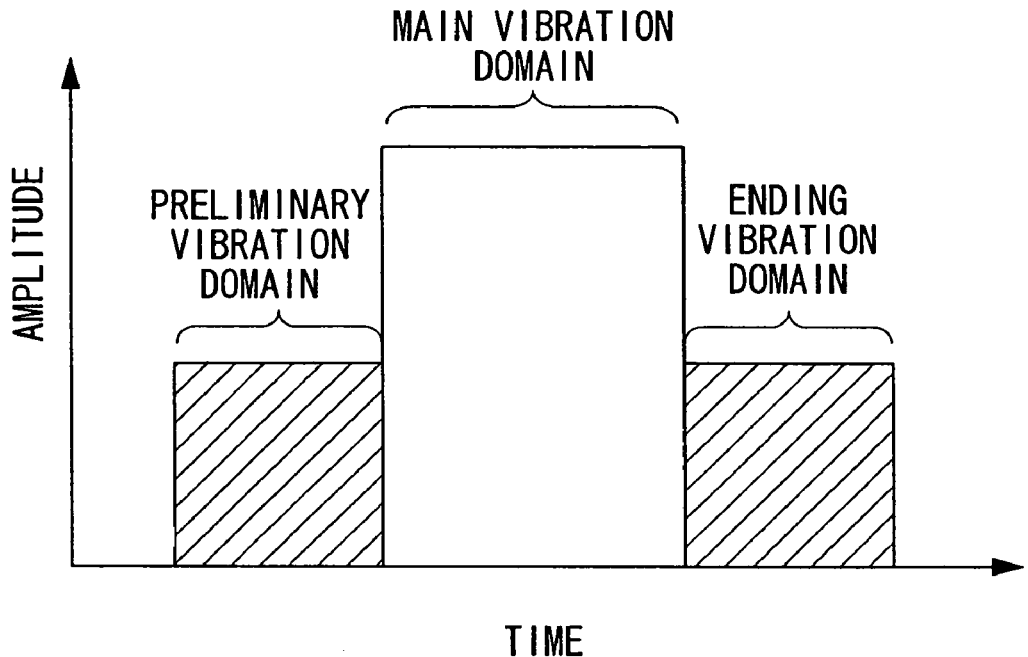
FIG. 7 is a diagram for describing a method of driving an ultrasonic motor according to one embodiment of the present invention.

In this state, a preliminary alternating signal for reducing the frictional force between the friction-contact members 10 and the driven body 3 is applied by the driving apparatus 6 to the ultrasonic vibrator 2 for a predetermined period of time (hereinafter, referred to as the "preliminary vibration domain"). Referring to FIG. 7, this preliminary vibration domain corresponds to a period provided prior to a main vibration domain in which the ultrasonic motor is actually driven. In this preliminary vibration domain, a preliminary alternating signal is applied to the ultrasonic vibrator 2 so as to cause the friction-contact members 10 to undergo a preliminary vibration which is smaller than the substantially elliptical vibration generated in the main vibration domain.

It is preferable that the preliminary vibration be generated at the friction-contact members 10 in this preliminary vibration domain such that a force applied to the driven body 3 from the friction-contact members 10 does not exceed the static frictional force. More preferably, the preliminary vibration should be such that the dynamic frictional force occurring between the friction-contact members 10 and the driven body 3 is as close to the static frictional force as possible. More specifically, the driving apparatus 6 applies to the ultrasonic vibrator 2 a preliminary alternating signal having an amplitude smaller than the amplitude of a driving alternating signal (described later) applied in the main vibration domain or a duty ratio smaller than the duty ratio of the driving alternating signal.

The preliminary alternating signal in this case may be a constant signal or a signal whose amplitude and/or duty ratio change (e.g., increase) gradually or stepwise in the preliminary vibration domain.

Figure 8:
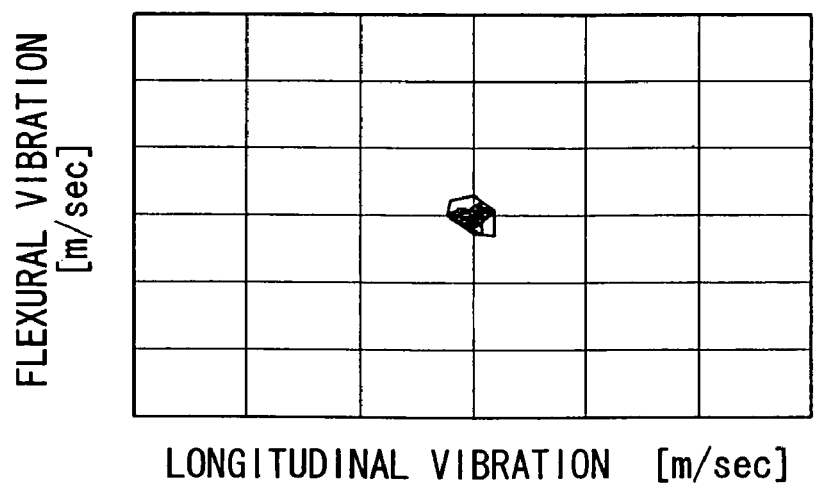
FIG. 8 is a diagram illustrating one example of vibration occurring at a friction-contact member in a preliminary vibration domain.

When such a preliminary alternating signal is applied to the ultrasonic vibrator 2, small, non-uniform preliminary vibrations as shown in FIG. 8 are generated in the friction-contact members 10. This breaks the contact, and consequently reduces the frictional force, between the friction-contact members 10 and the driven body 3.

Figure 9:
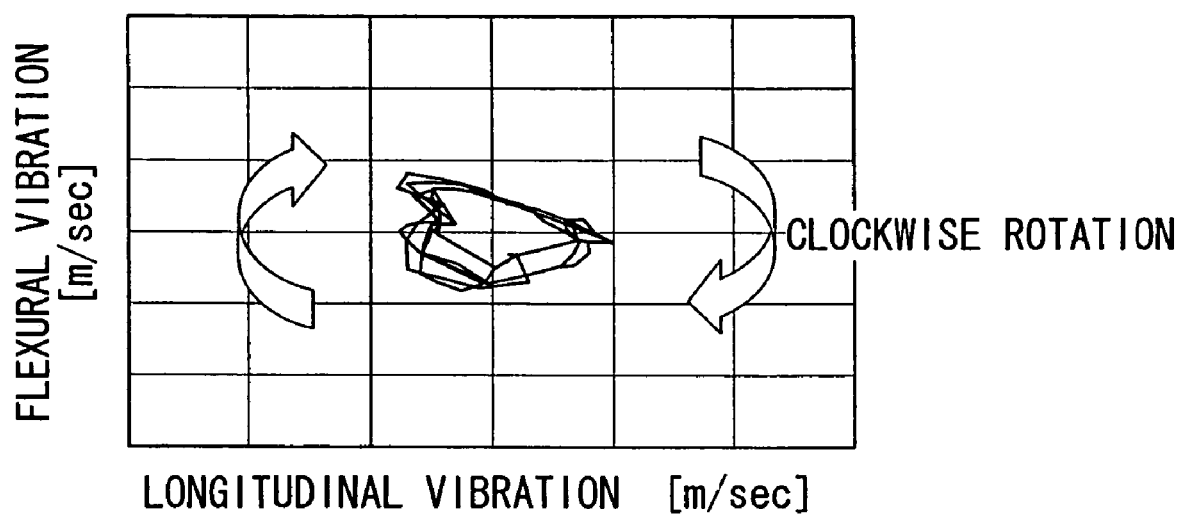
FIG. 9 is a diagram illustrating one example of vibration occurring at a friction-contact member in a main vibration domain.

In this state, that is, in a state where the frictional force between the friction-contact members 10 and the driven body 3 is reduced compared with that in the contact state, the driving apparatus 6 supplies the ultrasonic vibrator 2 with a driving alternating signal for actually driving the ultrasonic motor 1. As a result, substantially elliptical vibrations which are larger than the vibrations in the preliminary vibration domain occur in the friction-contact members 10, as shown in FIG. 9. Accordingly, the friction-contact members 10 are made to undergo substantially elliptical motion, and the friction-contact members 10 push the driven body 3 in a direction tangential to the substantially elliptical motion due to the dynamic frictional force generated between the friction-contact members 10 and the driven body 3. The two friction-contact members 10 alternately repeat this pushing operation based on dynamic friction, and accordingly, the process of bringing the friction-contact members 10 into contact with and moving the friction-contact members 10 away from the driven body 3 is intermittently repeated. In this manner, the driven body 3 is moved relative to the ultrasonic vibrator 2.

When the driven body 3 is moved close to a target position in the main vibration domain, the driving apparatus 6 supplies the ultrasonic vibrator 2 with an ending alternating signal for smoothly stopping the ultrasonic motor 1 for a predetermined period of time (hereinafter, referred to as the "ending vibration domain"). As a result, the substantially elliptical vibration generated in the friction-contact members 10 becomes small, thus stopping the movement of the driven body 3.

Thereafter, when the driving apparatus 6 stops supplying the ending alternating signal at the end of the ending vibration domain, the vibration of the friction-contact members 10 stops, thus bringing the friction-contact members 10 back into a contact state with the driven body 3.

In the ending vibration domain, the driving apparatus 6 applies to the ultrasonic vibrator 2 an ending alternating signal having an amplitude smaller than the amplitude of the driving alternating signal applied in the main vibration domain or a duty ratio smaller than the duty ratio of the driving alternating signal. The ending alternating signal in this case may be equivalent to or different from the preliminary alternating signal. In addition, the ending alternating signal may be a signal whose amplitude or duty ratio changes in a stepwise manner.

Figure 10:
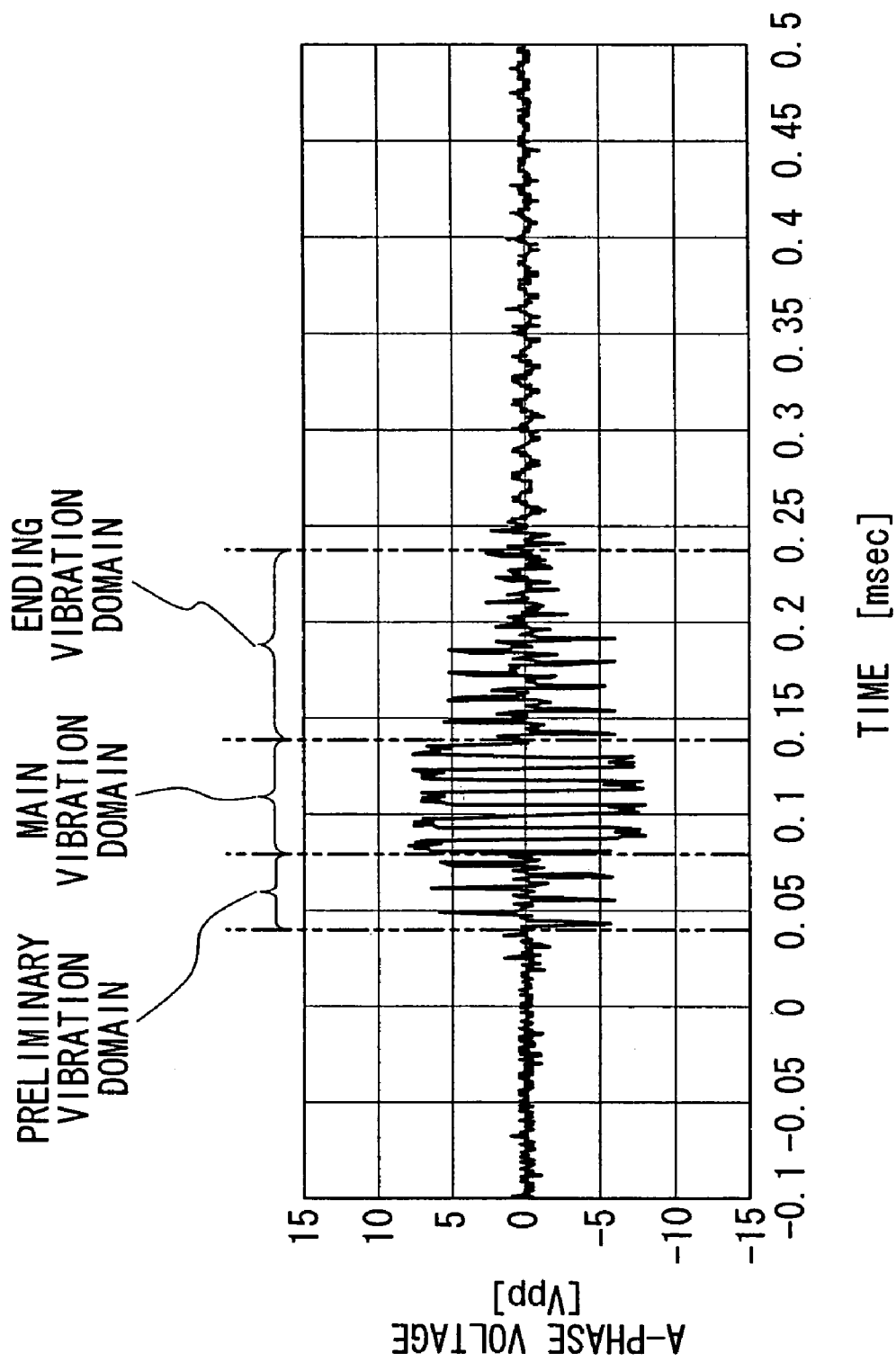
FIG. 10 is a diagram illustrating one example of a preliminary alternating signal, a driving alternating signal, and an ending alternating signal that are applied to an ultrasonic vibrator.

FIG. 10 shows one example of the voltage applied to the A-phase external electrodes 11 of the ultrasonic vibrator 2 from the driving apparatus 6 in the above-described preliminary vibration domain, main vibration domain, and ending vibration domain. In FIG. 10, the duty ratio of the preliminary alternating signal is made smaller than the duty ratio of the driving alternating signal. The ending alternating signal has a duty ratio that decreases gradually. An alternating signal having lower energy than that of the driving alternating signal applied to the ultrasonic vibrator 2 in the main vibration domain is applied in the preliminary vibration domain and the ending vibration domain as described above. This allows, for example, the frictional force between the driven body 3 and the friction-contact members 10 to be reduced without moving the driven body 3 relative to the ultrasonic vibrator 2 in the preliminary vibration domain. Furthermore, in the ending vibration domain, the movement of the driven body 3 can be ceased smoothly. It should be noted that the signal pattern shown in FIG. 10 is just one example; the preliminary alternating signal and other signals are not limited to this exemplary signal pattern.

As described above, according to the method and apparatus for driving an ultrasonic motor according to this embodiment, the preliminary vibration domain where the friction-contact members 10 are subjected to preliminary vibration is provided prior to the main vibration domain in which the ultrasonic motor 1 is driven. This allows the ultrasonic motor 1 to enter a full-operation mode via a state where the frictional force between the friction-contact members 10 and the driven body 3 is decreased sufficiently. By doing so, sticking and slipping is prevented from occurring, and accordingly, stable driving of the ultrasonic motor can be achieved. In addition, vibration noise resulting from abruptly starting to drive the ultrasonic motor 1 is prevented.

In the above-described embodiment, the driving apparatus 6 may be realized in the form of hardware or in the form of software for achieving the above-described drive control processing. In this case, the driving apparatus 6 includes components such as a central processing unit (CPU), a hard disc drive (HDD), a read only memory (ROM), and a random access memory (RAM). A series of processing steps for achieving the above-described various functions are stored, for example, in the ROM as a program, which is loaded, for example, into the RAM by the CPU for information processing and computation to achieve the above-described functions.

Although the present invention has been described by way of the foregoing embodiment with reference to the drawings, the present invention can be realized not only by this embodiment. A wide variety of modifications are included in the present invention so long as they do not depart from the spirit and scope of the present invention.

First, although the driven body 3 is moved relative to the ultrasonic vibrator 2 in the above-described embodiment, it is also acceptable to move the ultrasonic vibrator 2 relative to the driven body 3.

Second, although the ultrasonic motor 1 includes one ultrasonic vibrator 2 in the above-described embodiment, the number of ultrasonic vibrators 2 is not particularly limited. Regardless of the number of ultrasonic vibrators 2, stable driving can be achieved by applying the above-described signals to each ultrasonic vibrator 2. In this case, a plurality of ultrasonic vibrators 2 may be provided with respective driving apparatuses 6 so that driving signals are supplied individually. Alternatively, the same signal may be supplied from one driving apparatus 6 to a plurality of ultrasonic vibrators 2.

What is claimed is:

1. A method for driving an ultrasonic motor comprising the step of:

applying a driving alternating signal to an ultrasonic vibrator to simultaneously generate two different vibration modes in the ultrasonic vibrator to cause a substantially elliptical vibration at an output terminal thereof, thus relatively moving the ultrasonic vibrator and a driven body in contact with the ultrasonic vibrator, wherein a preliminary vibration domain in which a preliminary vibration smaller than the substantially elliptical vibration is generated at the output terminal is provided prior to a main vibration domain in which the driving alternating signal is applied, and an ending vibration domain in which an ending vibration smaller than the substantially elliptical vibration is generated at the output terminal is provided after the main vibration domain.

2. The method for driving an ultrasonic motor according to claim 1, wherein the preliminary vibration is generated at the output terminal in the preliminary vibration domain in such a manner that a force applied to the driven body from the output terminal does not exceed a static frictional force.

3. The method for driving an ultrasonic motor according to claim 1, wherein at least one of a preliminary alternating signal applied to the ultrasonic vibrator in the preliminary vibration domain and an ending alternating signal applied to the ultrasonic vibrator in the ending vibration domain has an amplitude smaller than an amplitude of the driving alternating signal or a duty ratio smaller than a duty ratio of the driving alternating signal.

4. An apparatus for driving an ultrasonic motor comprising:

a unit configured to apply a driving alternating signal to an ultrasonic vibrator to simultaneously generate two different vibration modes in the ultrasonic vibrator to cause a substantially elliptical vibration at an output terminal thereof, thus relatively moving the ultrasonic vibrator and a driven body in contact with the ultrasonic vibrator, wherein a preliminary vibration domain in which a preliminary vibration smaller than the substantially elliptical vibration is generated at the output terminal is provided prior to a main vibration domain in which the driving alternating signal is applied, and an ending vibration domain in which an ending vibration smaller than the substantially elliptical vibration is generated at the output terminal is provided after the main vibration domain.

5. The apparatus for driving an ultrasonic motor according to claim 4, wherein the preliminary vibration is generated at the output terminal in the preliminary vibration domain in such a manner that a force applied to the driven body from the output terminal does not exceed a static frictional force.

6. The apparatus for driving an ultrasonic motor according to claim 4, wherein at least one of a preliminary alternating signal applied to the ultrasonic vibrator in the preliminary vibration domain and an ending alternating signal applied to the ultrasonic vibrator in the ending vibration domain has an amplitude smaller than an amplitude of the driving alternating signal or a duty ratio smaller than a duty ratio of the driving alternating signal.

* * * * *